PROCESS FOR PRODUCTION OF ANHYDROUS HYDROGEN BROMIDE FROM LITHIUM BROMIDE

Shigeto Suzuki, San Francisco, Calif., assignor to California Research Corporation, San Francisco, Calif., a corporation of Delaware
No Drawing. Filed Nov. 22, 1963, Ser. No. 325,771
7 Claims. (Cl. 23—154)

This invention relates to a method of generating anhydrous hydrogen bromide from lithium bromide. More particularly, it relates to the production of anhydrous bromine-free hydrogen bromide suitable for use in the free radical addition of hydrogen bromide to olefinic hydrocarbons.

It is known to produce anhydrous hydrogen bromide by a variety of chemical routes, but these do not lend themselves to processes where efficient regeneration and recycle of anhydrous hydrogen bromide is required. Moreover, in the customary art method, i.e., the interaction of the strong mineral acid, concentrated sulfuric acid, with bromide salts, a concurrent formation of elemental bromine and by-product sulfate salt cake greatly complicates the process. The bromine must be removed from the hydrogen bromide because of its exceptional chemical reactivity. Its presence as an impurity in anhydrous hydrogen bromide, in general, yields undesirable by-products in reaction systems requiring dry hydrogen bromide.

It has now been found that anhydrous hydrogen bromide is produced by heating a solution of substantially anhydrous lithium bromide in an organic carboxylic acid at a temperature above about 150° C. The hydrogen bromide is evolved as a gas essentially free of elemental bromine and may be directly used for free radical catalyzed addition reactions of hydrogen bromide to olefinic hydrocarbons as in the preparation of n-alkyl bromides.

In a preferred embodiment of the present invention, lithium bromide is dissolved in benzoic acid and heated. At about 150° C., a noticeable evolution of hydrogen bromide occurs. After about two hours' reaction time at 250–260° C., the reaction is about 90% complete.

Removal of the hydrogen bromide from the liquid reaction medium is facilitated by the introduction of an inert gas such as nitrogen, carbon dioxide and the like into the solution. With increasing temperature, the rate of evolution of hydrogen bromide correspondingly increases. On the other hand, no particular advantage accrues by carrying out the reaction above about 350° C.

Suitable organic carboxylic acids for use in the present process are those acids having boiling points of at least 150° C.; preferably, the acids have boiling points of above 250° C. Representative acids useful in the present process are benzoic, (o, m, or p)-toluic, pivalic, dodecanoic, stearic, pimelic, glutaric, caprylic, capric, hexahydrobenzoic, lauric, 2-ethylhexanoic, hydrocinnamic, myristic, palmitic, α-naphthylacetic, sebacic, α-naphthoic, isobutyric, butyric, isovaleric, hexanoic, isocaproic, 4-methylhexanoic, heptanoic, cyclohexanecarbocyclic, n-undecyclic and the like. In general, the suitable acids have less than 20 carbon atoms per molecule, from 1 to 2 carboxyl groups and are characterizable by the general formula $R(CO_2H)_n$, where $n$ is 1–2 and R is a hydrocarbyl radical containing from 3–18 carbon atoms, including alkyl, cycloalkyl, aryl, alkylaryl, and alkylcycloalkyl hydrocarbyl groups. Benzoic and alkyl-substituted benzoic acids are preferred. All the above acids are characterized by their resistance to chemical attack by hydrogen bromide under the present reaction conditions.

Example 1

Into a turbomixer having approximately a 100 ml. capacity was charged 61 grams of benzoic acid and 15 grams (approximately 0.15 mol) of lithium bromide. The mixture was heated to a temperature in the range 250–260° C. with stirring, and nitrogen gas at a flow rate of 235 ml. per minute was passed through the heated mixture. After one hour at temperature, approximately 80% of the theoretical amount of hydrogen bromide had been evolved. At two hours, 89% of the theoretical hydrogen bromide had been evolved. The reaction is substantially complete after 4 hours of reaction time.

Example 2

As in Example 1 except that 10.3 grams (0.10 mol) of sodium bromide and 61 grams (0.5 mol) of benzoic acid were charged to the reactor. The reaction mixture was stirred vigorously at 225° C. for one hour, during which time nitrogen was passed through the mixture at a rate of 55 ml. per minute. No hydrogen bromide was detectable in the off-gas. At the end of the period, an additional 10.3 grams of sodium bromide were added, and the process was continued for an additional hour at 250° C. Again, no trace of hydrogen bromide could be detected in the off-gas. At this point, 0.3 gram of lithium bromide was added to the reaction mixture and the heating continued at 250° C. for an additional 1.5 hours. Except for a trace of hydrogen bromide due to the lithium bromide added, no additional hydrogen bromide was detectable in the off-gas.

When potassium bromide or magnesium bromide were used in place of lithium bromide in similar experiments, no detectable hydrogen bromide was noted.

I claim:

1. Process for the production of anhydrous hydrogen bromide which comprises heating a solution consisting essentially of substantially anhydrous lithium bromide in an organic carboxylic acid, said heating being at a temperature in the range from about 150–350° C. and recovering the resulting evolved hydrogen bromide gas.

2. The process as in claim 1 wherein an inert gas is introduced into said heated solution.

3. Process for the production of anhydrous hydrogen bromide which comprises heating a solution consisting essentially of substantially anhydrous lithium bromide in an organic carboxylic acid, said heating being at a temperature in the range from about 150–350° C., said oragnic carboxylic acid being characterized by the general formula:

$$R(CO_2H)_n$$

wherein "$n$" is a number in the range 1–2, inclusive, wherein "R" is a hydrocarbyl radical having from 3–18 carbon atoms selected from the group consisting of alkyl, cycloalkyl, aryl, alkylaryl and alkylcycloalkyl groups, and recovering the resulting evolved hydrogen bromide gas.

4. The process of claim 3 wherein and inert gas is introduced into said heated solution.

5. Process for the production of anhydrous hydrogen bromide gas which comprises heating a solution consisting essentially of substantially anhydrous lithium bromide dissolved in an organic carboxylic acid, said heating being at a temperature in the range from about 150–350° C., said acid being characterized by the general formula:

$$HO_2CC_6H_4R$$

wherein R is selected from the group consisting of hydrogen and alkyl radicals, said acid having less than 20 carbon atoms.

6. The process of claim 5 wherein an inert gas is introduced into said heated solution.

7. The process of claim 5 wherein said acid is benzoic acid.

References Cited by the Examiner

Jacobson's "Encyclopedia of Chemical Reactions," volume 4, page 316, Reinhold Pub. Corp., New York.

J. W. Mellor's "A Comprehensive Treatise on Inorganic and Theoretical Chemistry," volume 2, 1922 edition, page 66, Longmans, Green & Co., New York.

MAURICE A. BRINDISI, *Primary Examiner*.